US009869176B2

(12) United States Patent
Dickson et al.

(10) Patent No.: US 9,869,176 B2
(45) Date of Patent: Jan. 16, 2018

(54) DOWNHOLE TO SURFACE DATA LIFT APPARATUS

(71) Applicant: Tubel Energy LLC, The Woodlands, TX (US)

(72) Inventors: Forest Dickson, Spring, TX (US); Clark Bergeron, The Woodlands, TX (US); Paulo Tubel, The Woodlands, TX (US)

(73) Assignee: TUBEL ENERGY, LLC, The Woodlands, TX (US)

(*) Notice: Subject to any disclaimer, the term of this patent is extended or adjusted under 35 U.S.C. 154(b) by 0 days.

(21) Appl. No.: 15/481,525

(22) Filed: Apr. 7, 2017

(65) Prior Publication Data

US 2017/0292370 A1 Oct. 12, 2017

Related U.S. Application Data

(60) Provisional application No. 62/319,700, filed on Apr. 7, 2016.

(51) Int. Cl.

| | |
|---|---|
| ***G01V 3/00*** | (2006.01) |
| ***E21B 47/12*** | (2012.01) |
| ***G08C 17/00*** | (2006.01) |
| ***E21B 47/00*** | (2012.01) |
| ***E21B 49/00*** | (2006.01) |
| ***E21B 47/09*** | (2012.01) |

(52) U.S. Cl.

CPC .............. *E21B 47/12* (2013.01); *E21B 47/00* (2013.01); *E21B 47/09* (2013.01); *E21B 49/00* (2013.01); *G08C 17/00* (2013.01)

(58) Field of Classification Search

CPC .......... E21B 47/12; E21B 47/00; E21B 47/09; E21B 49/00; G08C 17/00

See application file for complete search history.

(56) References Cited

U.S. PATENT DOCUMENTS

| | | | | |
|---|---|---|---|---|
| 5,721,538 | A * | 2/1998 | Tubel | E21B 34/066 340/853.1 |
| 5,730,219 | A * | 3/1998 | Tubel | E21B 47/10 166/113 |
| 5,941,307 | A * | 8/1999 | Tubel | E21B 34/066 166/313 |
| 6,046,685 | A * | 4/2000 | Tubel | E21B 23/03 137/606 |
| 6,885,308 | B2 * | 4/2005 | Smith | E21B 47/011 324/339 |
| 2002/0171560 | A1 * | 11/2002 | Ciglenec | E21B 7/061 340/853.1 |
| 2003/0020631 | A1 * | 1/2003 | Haase | E21B 47/12 340/853.1 |

(Continued)

*Primary Examiner* — Joseph Feild
*Assistant Examiner* — Rufus Point
(74) *Attorney, Agent, or Firm* — Maze IP Law, PC

(57) ABSTRACT

Data may be collected from a wellbore by retrievably deploying a data receiver tool to a location proximate a gauge located in the wellbore, where the gauge comprises a sensor used to collect data from the well and where the location is at a distance sufficient to allow wireless data communication between a first wireless data transceiver and a gauge wireless data transceiver; securing the data receiver tool at that location; transmitting data from the gauge memory to the data receiver tool; and storing the transmitted data in the data receiver tool writeable memory.

18 Claims, 3 Drawing Sheets

(56) References Cited

U.S. PATENT DOCUMENTS

| | | | | |
|---|---|---|---|---|
| 2005/0007259 | A1* | 1/2005 | Minto | G01V 1/40<br>340/854.3 |
| 2013/0192823 | A1* | 8/2013 | Barrilleaux | E21B 34/06<br>166/250.01 |
| 2016/0084076 | A1* | 3/2016 | Fanini | E21B 47/12<br>340/853.1 |
| 2016/0115783 | A1* | 4/2016 | Zeng | E21B 47/124<br>340/854.4 |

* cited by examiner

DOWNHOLE TO SURFACE DATA LIFT APPARATUS

RELATION TO PRIOR APPLICATIONS

This applications claims priority through U.S. Provisional Patent Application 62/319,700 titled "Downhole to Surface Data Lift Apparatus" filed Apr. 7, 2016.

FIELD OF THE INVENTION

The disclosed invention related to data acquisition within a wellbore.

BACKGROUND

Data acquisition in a well during production and drilling is known in the art. In the production sector of the exploration and production of hydrocarbons, downhole gauges for production and reservoir evaluation are used with permanent and retrievable systems. The retrievable systems are normally deployed inside production tubing using an electrical cable that transmits information from the well in real time to the surface as the system is pulled from the bottom of the well to the surface, logging the entire well for data.

Permanently and semi-permanently deployed gauges are also used in the wellbore. Permanent gauges use a cable mounted on the outside of the production tubing from the surface to where the gauge is located inside of the well. The gauges transmit data in real time continuously. If the cable is cut, the gauge is no longer connected to the surface and no data are transferred to the surface. Cable deployment is also very complicated and can cause the customer to have to go in the well to fish the system if the cable is not flush to the production tubing. Semi-permanent gauges exist where the semi-permanent gauge seats in a side pocket mandrel inside the well, collects data, and stores the data in memory. When the operator wants data the gauge must be retrieved from the well, typically with specialty equipment to retrieve and install the gauge. There is a potential for the gauge to fall from the retrieval equipment and go to the bottom of the well. Also, the gauge may not come out of the side pocket gauge.

Some systems exist where the gauge does not need to be retrieved from a downhole location where the systems do not use downhole cables. These systems may utilize devices deployed with the use of an electric line or slick line downhole to retrieve desired data from the gauge.

FIGURES

The figures supplied herein illustrate various embodiments of the invention.

DESCRIPTION OF EXEMPLARY EMBODIMENTS

In its embodiments, as described herein the disclosed data receiver tool can retrieve data from a downhole gauge, which may be deployed permanently or semi-permanently in a wellbore, by traveling independently through the wellbore, without the use of cables such as an electric line or slick line.

Figure 1:
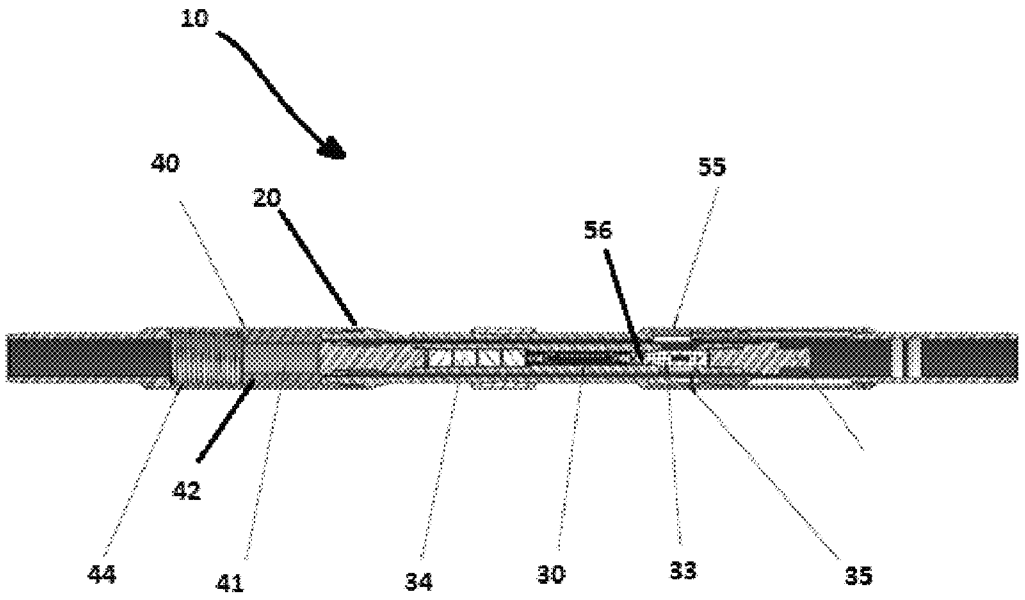
FIG. 1 is a cutaway view in partial perspective of a first exemplary data receiver.

Referring to FIG. 1, data receiver tool 10 comprises pressurized housing 20 configured to be retrievably disposed within 100 wellbore; one or more wireless receivers 30 disposed at least partially within housing 20; and positioner 40.

Fishing head 12 may be present and disposed at least partially within housing 20 and act as an aid in retrieving and/or deploying data receiver tool 10 within wellbore 101.

Figure 2:
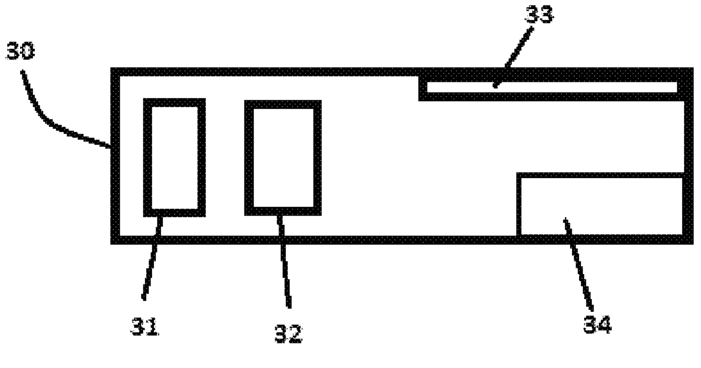
FIG. 2 is a block diagram of a wireless receiver.

Referring additionally to FIG. 2, wireless receiver 30 typically comprises one or more wireless data receivers 31, at least one of which is typically a transceiver, and one or more first data collectors 32, which may be operatively placed in communication with first wireless data receiver 31. Typically, each data collector 32 comprises a writeable or rewritable memory such as a magnetic disk, erasable memory, flash drive, or the like, or a combination thereof. In most configurations, antenna 33 is operatively in communication with first wireless data receiver 31. In some configurations, wireless gauge antenna housing 35 which is an electromagnetic wave energy transparent housing is present and allows communications to occur with the outside of housing 20.

Power source 34 is operatively in communication with first wireless data receiver 31 and data collector 32.

Positioner 40 typically comprises one or more position detectors 41 and one or more latches 42 adapted to move data receiver tool 10 to and secure data receiver tool 10 at a predetermined distance from gauge 50 sufficient to allow data communication between gauge 50 and data receiver tool 10. Positioner 40 may comprise catcher assembly 43 located at a predetermined within wellbore 101, where catcher assembly 43 is configured to cooperatively and releasably receive data receiver tool 10. Positioner 40 may further comprising landing spring 44 which is configured to absorb shocks as data receiver tool 10 arrives downhole proximate gauge 50.

In certain embodiments, data receiver tool 10 comprises one or more sensors 55 which are configured to collect data from sensors 56 embedded in data receiver tool 10.

Figure 3:
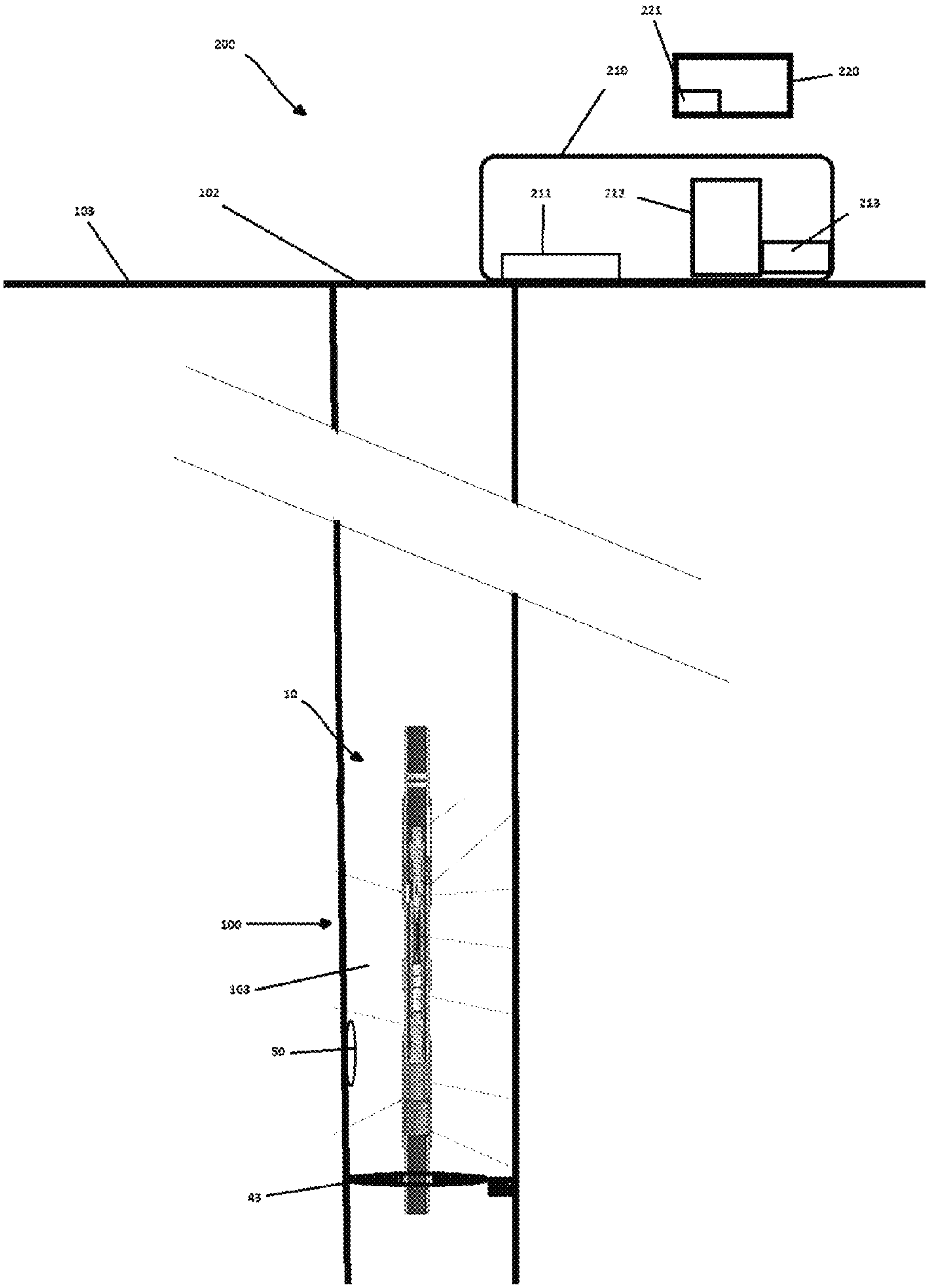
FIG. 3 is a block diagram of an exemplary system incorporating a data receiver.

Referring now to FIG. 3, data collection system 200 comprises data receiver tool 10, which is as described above and which is configured to independently travel into and out from well 100, the well comprising wellbore 101 and wellhead 102, and data acquisition system 210 located outside wellhead 102 which is configured to collect data from data receiver tool 10 once data receiver tool 10 returns to surface 103.

Data acquisition system 210 comprises second data transceiver 211, data processor 212 operatively in communication with second data transceiver 211, and data store 213 operatively in communication with data processor 212. Typically, data acquisition system 211 is located outside wellhead 103 and configured to collect data from data receiver tool 10 once it returns to surface 103.

Figure 4:
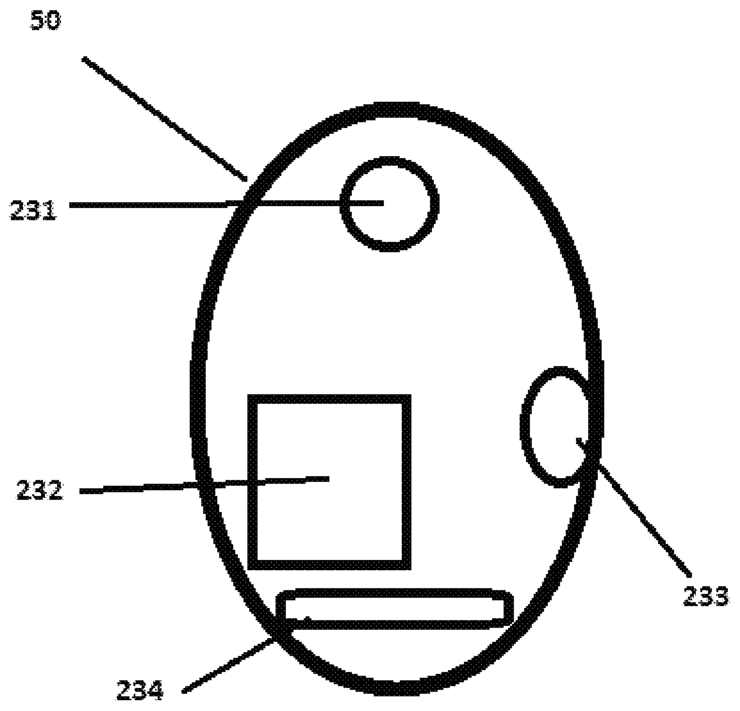
FIG. 4 is a block diagram of a sensor.

Referring additionally to FIG. 4, in most embodiments data collection system 200 further comprises gauge 50 which is deployed in the wellbore, in embodiments permanently or semi-permanently. Gauge 50 typically comprises one or more gauge wireless data transceivers 231, gauge data collector 232, which comprises a writeable memory and is operatively in communication with gauge wireless data transceiver 231, one or more sensors 233 operatively in communication with gauge wireless data transceiver 231 and/or gauge data collector 232, and power source 234 which is operatively in communication with gauge wireless data transceiver 231, gauge data collector 232, and sensor 233.

Sensor 233 may comprise a predetermined set of sensors for monitoring one or more parameters such as production sensors and/or formation monitoring sensors or the like, or a combination thereof.

In embodiments, external interface communicator 220 is present and operatively in communication with data processor 212. External interface communicator 220 may comprise a display or other visual device capable of displaying data and may further comprise third transceiver 221 which can be operatively placed in communication with data processor 212. In certain embodiments, where external interface communicator 220 further comprises third transceiver 221, gauge wireless data transceiver 231 may also be operatively in communication with external interface communicator 220.

Gauge power supply 234 may comprise a downhole power generator, a battery, a rechargeable battery, or a rechargeable super capacitor.

In the operation of exemplary embodiments, data may be collected from wellbore 101 using data receiver tool 10, as described above, by deploying gauge 50 in well 100, where gauge 50 is as described above, and using one or more sensors 233 to collect data from well 100. The collected data are typically stored in the gauge's writeable memory. Gauge 50 may be deployed permanently or semi-permanently within wellbore 101. In embodiments, gauge 50 may be deployed in well 100 by deploying gauge 50 as part of the casing, liner or production tubing.

At a desired time, data receiver tool 10 is deployed into wellbore 101 and positioner 40 used to maneuver data receiver tool 10 to a location proximate gauge 50 sufficient to allow wireless data communication between first wireless data transceiver 31 and gauge wireless data transceiver 231. Using positioner 40 typically comprises allowing data receiver tool 10 to travel in wellbore 101 such as by using gravity and using catcher assembly 43, which is deployed at a predetermined distance in wellbore 101 such as a location just or somewhat below gauge 50, to stop the travel of data receiver tool 10. In certain embodiments, data receiver tool 10 travels in wellbore 101 to a position within or at least partially within an interior of gauge 50.

Once sufficiently close, data are transmitted from gauge 50 to data receiver tool 10, by way of example and not limitation including gathering data from memory associated with gauge data collector 232 and transmitting that data. Transmitted data, once received by data receiver tool 10, are typically stored in memory associated with data collector 32.

In certain embodiments, transmitting data from gauge memory to data receiver tool 10 may comprise detecting when data receiver tool 10 is located a predetermined distance from the gauge; sending a send data command message to gauge 50 such as from data receiver tool 10 that data receiver tool 10 is ready to receive data; and transmitting the data from gauge 50 to data receiver tool 10 after gauge 50 has received the send data command message.

It may be advantageous to retrieve data receiver tool 10 from wellbore 101 at a predetermined time. In embodiments, once data receiver tool 10 is determined to have completed the data transfer due to a calculation at surface 103 on the time required to transfer the data, fluid flow rate of well 100 may be increased to release data receiver tool 10 from catcher assembly 43 and be sent to a further location. By way of example and not limitation, once released fluid flow within well 100 may carry data receiver tool 10 back to the surface.

It is understood that, as used herein, wireless may comprise using electromagnetic waves and/or acoustic waves.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A data receiver tool, comprising:
- a. a pressurized housing configured to be retrievably disposed within a wellbore;
- b. a wireless receiver disposed at least partially within the housing, the wireless receiver comprising:
  - i. a first wireless data receiver;
  - ii. a first data collector, operatively in communication with the first wireless data receiver, the data collector comprising a writeable memory;
  - iii. a power source operatively in communication with the first wireless data receiver; and
  - iv. an antenna operatively in communication with the first wireless data receiver; and
- c. a positioner, comprising:
  - i. a position detector; and
  - ii. a latch adapted to move the data receiver tool to and secure the data receiver tool at a predetermined distance from a gauge sufficient to allow data communication between the gauge and the first wireless data receiver.

2. The data receiver tool of claim 1, wherein the first wireless data receiver comprises a wireless data transceiver.

3. The data receiver tool of claim 1, wherein the positioner further comprises a catcher assembly located at a predetermined within the wellbore, the catcher assembly configured to cooperatively and releasably receive the data receiver tool.

4. A data collection system, comprising:
- a. a data receiver tool configured to independently travel into and out from a well, the well comprising a wellbore and a wellhead, the data receiver tool comprising:
  - i. a pressurized housing configured to be retrievably disposed within a wellbore;
  - ii. a wireless receiver disposed at least partially within the housing, the wireless receiver comprising:
    1. a first wireless data receiver;
    2. a first data collector, operatively in communication with the first wireless data receiver, the data collector comprising a writeable memory;
    3. a power source operatively in communication with the first wireless data receiver; and
    4. an antenna operatively in communication with the first wireless data receiver; and
  - iii. a positioner, comprising:
    1. a position detector; and
    2. a latch adapted to move the data receiver tool to and secure the data receiver tool at a predetermined distance from a gauge sufficient to allow data communication between the gauge and the first wireless data receiver; and
- b. a data acquisition system located outside the wellhead that collects data from the data receiver tool once it returns to the surface, the data acquisition module comprising:
  - i. a second data transceiver;

ii. a data processor operatively in communication with the second data transceiver;

iii. a data store operatively in communication with the data processor; and iv. an external interface communicator operatively in communication with the data processor.

5. The data collection system of claim 4, wherein the external interface communicator further comprises a third transceiver operatively in communication with the data processor.

6. The data collection system of claim 4, further comprising a gauge deployed in the wellbore, the gauge comprising:

a. a gauge wireless data transceiver;

b. a gauge data collector, comprising a writeable memory and operatively in communication with the gauge wireless data transceiver;

c. a sensor operatively in communication with the gauge wireless data transceiver; and d. a power source operatively in communication with the gauge wireless data transceiver, the gauge data collector, and the sensor.

7. The data collection system of claim 6, wherein:

a. the external interface communicator further comprises a third transceiver operatively in communication with the data processor; and b. the gauge wireless data transceiver is operatively in communication with the external interface communicator.

8. The data collection system of claim 6, wherein the gauge power supply comprises a downhole power generator, a battery, a rechargeable battery, or a rechargeable super capacitor.

9. The data collection system of claim 6, wherein the sensor comprises a predetermined set production sensors and/or formation monitoring sensors.

10. A method of collecting data from a wellbore using a data receiver tool, the data receiver tool comprising a pressurized housing configured to be retrievably disposed within a wellbore, a wireless receiver disposed at least partially within the housing where the wireless receiver comprises a first wireless data receiver, a first data collector operatively in communication with the first wireless data receiver and comprising a writeable memory, a power source operatively in communication with the first wireless data receiver, and an antenna operatively in communication with the first wireless data receiver, and a positioner which comprises a position detector and a latch adapted to move the data receiver tool to and secure the data receiver tool at a predetermined distance from a gauge sufficient to allow data communication between the gauge and the first wireless data receiver, the method comprising:

a. deploying a gauge in a well, the gauge comprising a gauge wireless data transceiver, a gauge data collector comprising a writeable memory operatively in communication with the gauge wireless data transceiver, a sensor operatively in communication with the gauge wireless data transceiver, and a power source operatively in communication with the gauge wireless data transceiver, the gauge data collector, and the sensor;

b. using the sensor to collect data from the well;

c. storing the collected data in the gauge writeable memory;

d. retrievably deploying the data receiver tool into the wellbore;

e. using the positioner to maneuver the data receiver tool to a location proximate the gauge at a distance sufficient to allow wireless data communication between the first wireless data transceiver and the gauge wireless data transceiver;

f. securing the data receiver tool at that location;

g. transmitting data from the gauge memory to the data receiver tool; and h. storing the transmitted data in the data receiver tool writeable memory.

11. The method of claim 10, wherein using the positioner comprises:

a. allowing the data receiver tool to travel in the wellbore using gravity; and b. using a catcher assembly deployed at a predetermined distance in the wellbore to stop the travel of the data receiver tool.

12. The method of claim 11, wherein the predetermined location comprises a location below the gauge.

13. The method of claim 11, wherein the predetermined location comprises a location within an interior of the gauge.

14. The method of claim 10, wherein deploying the gauge comprises deploying the gauge permanently or semi-permanently in the wellbore.

15. The method of claim 10, wherein deploying the gauge in a well comprises deploying the gauge as part of the casing, liner or production tubing.

16. The method of claim 10, wherein transmitting data from the gauge memory to the data receiver tool comprises:

a. detecting when the data receiver tool is located the location proximate the gauge;

b. sending a send data command message to the gauge from the data receiver tool to indicate that the receiver is ready to receive data; and c. transmitting the data from the gauge to the data receiver tool after the gauge has received the send data command message.

17. The method of claim 10, further comprising retrieving the data receiver tool from the wellbore at a predetermined time.

18. The method of claim 17, wherein retrieving the data receiver tool further comprises:

a. sensing completion of the data transfer by the data receiver tool;

b. actuating the data receiver tool to release itself from its secured position; and c. allowing fluid flow within the well to carry the data receiver tool back to the surface.

* * * * *